US012652646B2

(12) United States Patent (10) Patent No.: US 12,652,646 B2
Guo (45) Date of Patent: Jun. 9, 2026

(54) METHODS AND APPARATUS OF PRIORITY OF PROCESSING DOWNLINK POSITIONING REFERENCE SIGNAL

(71) Applicant: GUANGDONG OPPO MOBILE TELECOMMUNICATIONS CORP., LTD., Dongguan (CN)

(72) Inventor: Li Guo, Allen, TX (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 307 days.

(21) Appl. No.: 18/620,494

(22) Filed: Mar. 28, 2024

(65) Prior Publication Data

US 2024/0244579 A1 Jul. 18, 2024

Related U.S. Application Data

(63) Continuation of application No. PCT/IB2022/060066, filed on Oct. 19, 2022.

(60) Provisional application No. 63/263,039, filed on Oct. 26, 2021.

(51) Int. Cl.
*H04W 64/00* (2009.01)
*H04L 5/00* (2006.01)

(52) U.S. Cl.
CPC ......... *H04W 64/006* (2013.01); *H04L 5/0051* (2013.01)

(58) Field of Classification Search
CPC .. H04W 64/006; H04W 64/00; H04L 5/0051; H04L 5/0048; H04L 5/0035; G01S 5/0205; G01S 5/0236; G01S 5/10
See application file for complete search history.

(56) References Cited

U.S. PATENT DOCUMENTS

2018/0077679 A1* 3/2018 Lee ...................... H04W 64/006
2019/0353748 A1* 11/2019 Rydén ........................ G01S 5/14
2020/0228381 A1 7/2020 Manolakos
(Continued)

FOREIGN PATENT DOCUMENTS

WO 2020060119 A1 3/2020
WO 2020146839 A1 7/2020
(Continued)

OTHER PUBLICATIONS

International Search Report of the International Application No. PCT/IB2022/060066, mailed on Jan. 10, 2023.
(Continued)

*Primary Examiner* — Wesley L Kim
*Assistant Examiner* — Erkin Abdullaev
(74) *Attorney, Agent, or Firm* — Ladas & Parry, LLP

(57) ABSTRACT

Methods and systems for reporting an indicator for a positioning measurement result are provided. In some embodiments, the method includes that: (1) a terminal device receives, from a network device, a downlink (DL) positioning reference signal (PRS) resource; (2) the terminal device receives assistance data, wherein the assistance data includes expected reference signal time difference (RSTD) and expected RSTD uncertainty; and (3) the terminal device determines whether a first physical cell identifier of a reference Transmission/Reception Point (TRP) is the same as a second physical cell identifier of the network device.

20 Claims, 3 Drawing Sheets

400

(56)            References Cited

U.S. PATENT DOCUMENTS

| 2021/0067990 | A1 * | 3/2021 | Opshaug | .............. | G01S 5/0036 |
| 2021/0328737 | A1 * | 10/2021 | Manolakos | .......... | H04W 64/00 |
| 2022/0053443 | A1 | 2/2022 | Kim | | |

FOREIGN PATENT DOCUMENTS

| WO | 2021211319 A1 | 10/2021 |
| WO | 2023073511 A1 | 5/2023 |

OTHER PUBLICATIONS

Written Opinion of the International Search Authority in the International Application No. PCT/IB2022/060066, mailed on Jan. 10, 2023.

3GPP TSG-RAN WG4 Meeting #94bis-e, R4-2004358, Electronic Meeting, Apr. 20-30, 2020, Title: Discussion on RSTD measurement, Source: Huawei, HiSilicon, Agenda item: 6.8.2.1.1, Document for: Discussion.

* cited by examiner

200

Wireless Channel 205A

Wireless Channel 205B

Terminal Device 203

Network Device 201

Location Sever 207

TERMINAL DEVICE 203

PROCESSOR 310

MEMORY 320

METHODS AND APPARATUS OF PRIORITY OF PROCESSING DOWNLINK POSITIONING REFERENCE SIGNAL

CROSS-REFERENCE TO RELATED APPLICATIONS

This is a continuation application of International Patent Application No. PCT/IB2022/060066, filed on Oct. 19, 2022, which claims the benefit of priority of U.S. Provisional Patent Application Ser. No. 63/263,039, filed Oct. 26, 2021. The contents of the above are incorporated by reference herein in their entireties.

BACKGROUND

Positioning technology is often used in wireless communication systems and navigation systems and is supported by new radio (NR) systems. In NR systems, a terminal device can be configured with one or more downlink (DL) positioning reference signal (PRS) resource sets, each including one or more DL PRS resources. However, the bandwidth of the DL PRS resources can be outside the bandwidth of an active Band Width Part (BWP) of the NR system, and the subcarrier spacing of the DL PRS resources may differ from that of the active BWP. Thus, systems need a time difference (also referred to as a measurement gap) for the terminal device to measure the DL PRS resources. If there is no time difference, the terminal device can request the time difference through Radio Resource Control (RRC) signaling.

However, processing a DL PRS resource outside a time difference can affect reception of DL channels and signals and transmission of uplink channels and signals, which may impair system performance. Current solutions for processing DL PRS resources have not defined priority of processing DL PRS resources and other channels. Thus, an improved system that defines priority of processing DL PRS resources outside of a time difference compared to DL reception and UL transmission is desirable and beneficial.

SUMMARY

The present disclosure relates to determining terminal device capabilities. More specifically, the present disclosure is directed to systems and methods for determining a terminal device's capability to process a downlink positioning reference signal resource outside a time difference.

Though the following systems and methods are described in relation to positioning processing, in some embodiments, the systems and methods may be used for other processing systems and methods.

In an aspect, a method employs a terminal device to receive, from a network device, a DL PRS resource. The method continues by receiving assistance data. The assistance data includes expected reference signal time difference (RSTD) and expected RSTD uncertainty for the DL PRS resource. The method continues by determining whether a first physical cell identifier of a reference Transmission/Reception Point (TRP) is the same as a second physical cell identifier of the network device.

In response to determining that the first physical cell identifier of the reference TRP is the same as a second physical cell identifier of the network device, the method continues by determining a first absolute value of the value of the expected RSTD added to a DL PRS expected RSTD and determining a second absolute value of the DL PRS expected RSTD subtracted from the value of the expected RSTD. In response to the first absolute value and second absolute value being less than a threshold, the method continues by determining that the DL PRS resource can be measured outside of a time difference.

Another aspect of the present disclosure is that it provides a system for indicating a terminal device (or user equipment, UE) whether DL PRS resources of one particular TRP can be measured outside a measurement gap (MG) (or a "time difference"). The system includes a processor; and a memory configured to store instructions, when executed by the processor, to cause a terminal device to perform operations of: receiving, from a network device, the DL PRS resource; receiving assistance data, wherein the assistance data includes expected reference signal time difference (RSTD) and expected RSTD uncertainty, the expected RSTD uncertainty indicating a value of the expected RSTD that the terminal device is expected to measure between a Transmission/Reception Point (TRP) and a reference TRP; in response to determining that a first physical cell identifier of the reference TRP is the same as a second physical cell identifier of the network device: determining a first absolute value of the value of the expected RSTD added to a DL PRS expected RSTD; determining a second absolute value of the DL PRS expected RSTD subtracted from the value of the expected RSTD; and in response to the first absolute value and second absolute value being less than a threshold, determining that the DL PRS resource can be measured outside of the time difference.

Another aspect of the present disclosure is that it provides a computer-readable storage medium, configured to store instructions, which cause a terminal device to perform operations of: receiving, from a network device, the DL PRS resource; receiving assistance data, wherein the assistance data includes expected reference signal time difference (RSTD) and expected RSTD uncertainty, the expected RSTD uncertainty indicating a value of the expected RSTD that the terminal device is expected to measure between a Transmission/Reception Point (TRP) and a reference TRP; in response to determining that a first physical cell identifier of the reference TRP is the same as a second physical cell identifier of the network device: determining a first absolute value of the value of the expected RSTD added to a DL PRS expected RSTD; determining a second absolute value of the DL PRS expected RSTD subtracted from the value of the expected RSTD; and in response to the first absolute value and second absolute value being less than a threshold, determining that the DL PRS resource can be measured outside of the time difference.

BRIEF DESCRIPTION OF THE DRAWINGS

To describe the technical solutions in the implementations of the present disclosure more clearly, the following briefly describes the accompanying drawings. The accompanying drawings show merely some aspects or implementations of the present disclosure, and a person of ordinary skill in the art may still derive other drawings from these accompanying drawings without creative efforts.

DETAILED DESCRIPTION

To describe the technical solutions in the implementations of the present disclosure more clearly, the following briefly describes the accompanying drawings. The accompanying drawings show merely some aspects or implementations of the present disclosure, and a person of ordinary skill in the art may still derive other drawings from these accompanying drawings without creative efforts.

Figure 1:
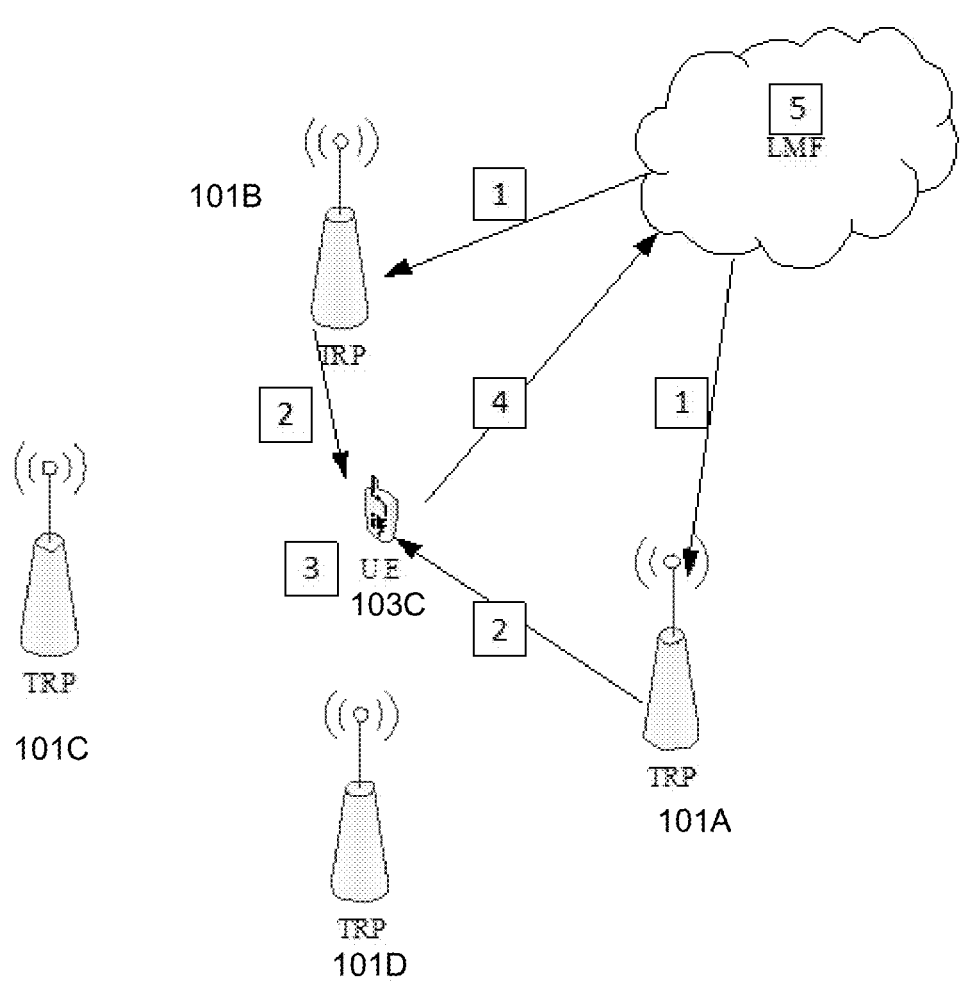
FIG. 1 is a schematic diagram of positioning based on a downlink measurement as used by prior art.

FIG. 1 is a schematic diagram of positioning based on a downlink measurement as used by prior art. FIG. 1 includes a plurality of transmission/reception points (TRPs), a terminal device 103 (also referred to as user equipment herein), and a location server (also referred to location management function or LMF herein). These components were employed in prior art to follow a basic new radio (NR) method. The method includes a first TRP 101A and the LMF 105 communicate with one another to coordinate downlink (DL) positioning reference signal (PRS) configurations. The first TRP 101A and the other TRPs 101 in the plurality transmits DL PRS resources based on the configurations. The terminal device 103 receives DL PRS resources transmitted from the TRPs 101 and measure the DL PRS resources. The terminal device 103 also measures DL PRS reference signal received power (RSRP) and reference signal time difference (RSTD). The terminal device 103 reports these measurement results to the LMF 105. Using the measurement results, the LMF 105 calculates the location of the terminal device 103 based on the measurement results.

The terminal device 103 may be configured with one or more DL PRS resource sets. Each DL PRS resource set may include one or more DL PRS resources. The terminal device 103 is provided with configuration parameters for each DL PRS resource sets. The parameters include a periodicity parameter, a first muting option parameter, a second muting option parameter, a muting bit parameter, resource repetition parameter, and an offset parameter. The periodicity parameter defines the DL PRS resource periodicity and takes values $$T_{per}^{PRS} \in 2^{\mu} \{4, 5, 8, 10, 16, 20, 32,$$

$$40, 64, 80, 160, 320, 640, 1280, 2560, 5120, 10240\}$$

slots, where $\mu$=0, 1, 2, 3 for a subcarrier spacings of 15, 30, 60 and 120 kHz, respectively, and the slot offset for DL PRS resource set with respect to System Frame Number (SFN0) slot 0 (SFN0). All the DL PRS resources within one DL PRS resource set are configured with the same DL PRS resource periodicity.

The first muting option parameter and second muting option parameter define time locations where the DL PRS resource is expected to not be transmitted for a DL PRS resource set. If the first muting option parameter is configured, each bit in its bitmap corresponds to a configurable number provided by the muting bit parameter. The muting bit parameter is consecutive instances of a DL PRS resource set where all DL PRS resources within the set are muted for the instance that is indicated to be muted. The length of the bit map may be {2, 4, 6, 8, 16, 32} bits. If the second muting option parameter is configured, each bit in its bitmap corresponds to a single repetition index for each of the DL PRS resources within each instance of a DL PRS resources set. The length bitmap is equal to the values of all repetition factors for the DL PRS resources. The offset parameter defines the time offset of the SFN0 slot 0 for a transmitting cell with respect to SFN0 slot 0 of a reference cell.

The bandwidth of a DL PRS resource may be outside the bandwidth of an active bandwidth part (BWP) of the terminal device 103 and the subcarrier spacing used by a DL PRS resource may be different from the subcarrier spacing of the active BWP of the terminal device 103. Given this, a time difference is needed for the terminal device 103 to measure DL PRS resources. The time difference for positioning is configured through radio resource control (RRC). When the terminal device 103 needs to measure a DL PRS resource and there is no time difference, the terminal device 103 can request time difference through RRC signaling.

Allowing a terminal device 103 to measure a DL PRS resource outside of the time difference can reduce the latency of positioning measurement. However, processing a DL PRS resource outside the time difference would affect the reception of DL channels and signals, such as a physical DL control channel (PDCCH), physical DL shared channel (PDSCH), channel state information reference signal (CSI-RS), and single-sideband modulation (SSB), and the transmission of uplink (UL) channels and signals, such as a physical UL shared channel (PUSCH), physical UL control channel (PUCCH), and sounding reference signal (SRS). Prior art solutions do not define priority of processing a DL PRS resource compared to another channel. Processing a DL PRS resource can cause negative impact on reception of a DL data channel and/or transmission of a UL data channel, thus impairing system performance. These drawbacks are addressed by the implementations of the present disclosure described herein.

Figure 2:
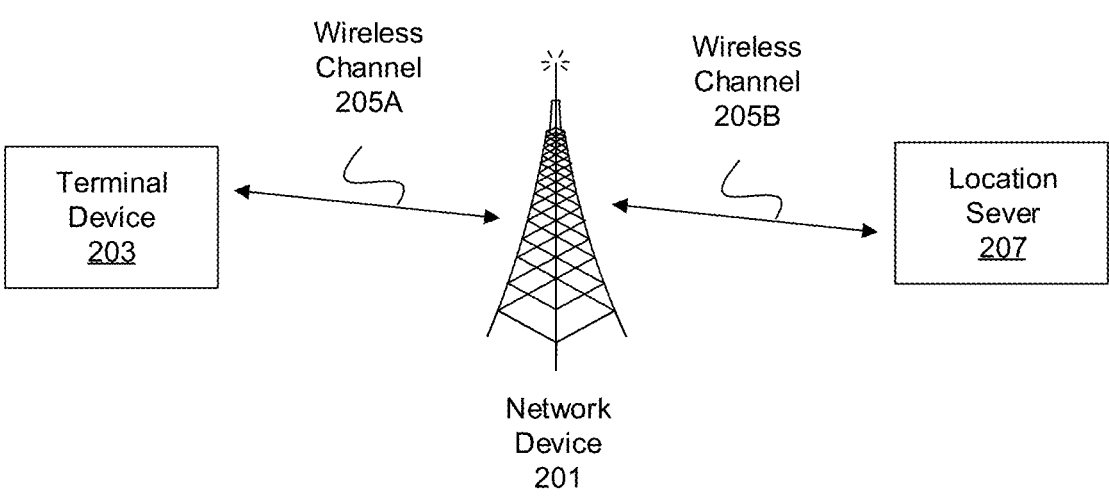
FIG. 2 is a schematic diagram of a wireless communication system in accordance with one or more implementations of the present disclosure.

FIG. 2 is a schematic diagram of a wireless communication system 200 in accordance with one or more implementations of the present disclosure. The wireless communication system 200 can implement the positioning systems and methods discussed herein. As shown in FIG. 2, the wireless communications system 200 can include a network device (or base station) 201. Examples of the network device 201 include a base transceiver station (Base Transceiver Station, BTS), a NodeB (NodeB, NB), an evolved Node B (eNB or eNodeB), a Next Generation NodeB (gNB or gNode B), a Wireless Fidelity (Wi-Fi) access point (AP), etc. In some embodiments, the network device 201 can include a relay station, an access point, an in-vehicle device, a wearable device, and the like. The network device 201 can include wireless connection devices for communication networks such as: a Global System for Mobile Communications (GSM) network, a Code Division Multiple Access (CDMA) network, a Wideband CDMA (WCDMA) network, an LTE network, a cloud radio access network (Cloud Radio Access Network, CRAN), an Institute of Electrical and Electronics Engineers (IEEE) 802.11-based network (e.g., a Wi-Fi network), an Internet of Things (IoT) network, a device-to-device (D2D) network, a next-generation network (e.g., a 5G network), a future evolved public land mobile network (Public Land Mobile Network, PLMN), or the like. A 5G system or network can be referred to as an NR system or network.

In FIG. 2, the wireless communications system 200 also includes a terminal device 203. The terminal device 203 can be an end-user device configured to facilitate wireless communication. The terminal device 203 can be configured to wirelessly connect to the network device 201 (via, e.g., via a wireless channel 205A) according to one or more corresponding communication protocols/standards. The terminal device 203 may be mobile or fixed. The terminal device 203 can be a user equipment (UE), an access terminal, a user unit, a user station, a mobile site, a mobile station, a remote station, a remote terminal, a mobile device, a user terminal, a terminal, a wireless communications device, a user agent, or a user apparatus. Examples of the terminal device 203 include a modem, a cellular phone, a smartphone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, an Internet-of-Things (IoT) device, a device used in a 5G network, a device used in a public land mobile network, or the like. For illustrative purposes, FIG. 2 illustrates only one network device 201 and one terminal device 203 in the wireless communications system 200. However, in some instances, the wireless communications system 200 can include additional network device 201 and/or terminal device 203.

The terminal device 203 can report whether the terminal device 203 is capable of processing a DL PRS resource outside of a time difference. A time difference (also referred to as a measurement gap, MG) is a time duration when the terminal device 203 is not transmitting or receiving signals. The terminal device 203 can be configured by the location server 207 (via, e.g., via a wireless channel 205B and the wireless channel 205A) to include time differences using RRC signaling. The terminal device 203 can be provided with configuration information that can indicate which DL PRS resource(s) can be processed outside the time difference. The LMF 207 or the network device 201 can provide this configuration information and indications, or the configuration information can be prespecified.

In some embodiments, the terminal device 203 receives an indication that one or more PRS resources from a first network device 201 can be processed in a PRS processing window. A PRS processing window is a mathematical function that is zero-valued outside of an interval of the PRS processing window and is employed to detect peaks within a PRS. The PRS processing window may include one or more instances of the PRS processing window to be used for processing PRS resources. For example, each instance may be used to process a PRS resources. In some embodiments, a new PRS processing window is received for processing each PRS resources.

In one example, the LMF 207 can send an indicator associate with network device 201 identification, dl-PRS-ID. The indicator can indicate that the terminal device 203 can process the one or more DL PRS resources associated with the dl-PRS-ID in the PRS processing window. In another example, the LMF 207 can provide a dl-PRS-process-indicator in assistance data associated with each network device 201. The dl-PRS-process-indicator may show an integer between 0 and 1 to indicated whether the one or more PRS resources can be processed in the PRS processing window. For instance, a dl-PRS-process-indicator of 1 indicates that the one or more PRS resources can be processed in the PRS processing window.

In some embodiments, the terminal device 203 receives indicators that indicate a first DL PRS resource set and whether one or more PRS resources in the first DL PRS resource set can be processed in a PRS processing window. For example, the LMF 207 can send an indicator associated with a PRS resource set. The indicator indicates that the terminal device 203 can process all DL PRS resources in the PRS resource set in a PRS processing window. In another example, the LMF 207 can send an indicator in "IE NR DL PRS" assistance data for each network device 201, where the parameter dl-PRS-process-indicator is an integer value between 0 and 1 that indicates whether all the PRS resources in the PRS resource set can be processed in a PRS processing window.

In some embodiments, the terminal device 203 can receive an indicator indicating that a first PRS resource can be processed in a PRS processing window. For example, the LMF 207 can send an indicator to the terminal device 203. The indicator is associated with a PRS resource and can indicate that the terminal device 203 can process the first PRS resource in a PRS processing window. In another example, the LMF 207 can provide an indicator in the "IE NR DL PRS" resource, where the parameter "dl-PRS-process-indicator" can be used to indicate that whether the first PRS resource can be proceed in the PRS processing window. For instance, the parameter is an integer between 0 and 1, where 0 indicates that the first PRS resource cannot be processed in the PRS processing window.

Further, the terminal device 203 assumes that PRS resources associated with the same physical cell identifier as the network device 201 that sends the PRS resource can be processed in the PRS processing window. The physical cell identifiers each indicate a physical layer identity of the cells (e.g., the network device 201 and a device that sent the PRS resources (e.g., a serving cell)). The terminal device 203 can also process PRS resources associated with different physical cell identifier as the network device 201 if so indicated that to the terminal device 203.

The terminal device 203 can determine whether DL PRS resources from a network device 201 can be processed outside a time difference based on assistance data. In some embodiments, the terminal device 203 may determine that a PRS resource received from a first network device 201 can be measured outside of the time difference if a physical cell identifier of the first network device 201 is the same as the physical cell identifier of a serving cell (e.g., another network device).

In some embodiments, the terminal device 203 is provided with assistance data. The assistance data includes a DL PRS expected RSTD (referred to as an "expected RSTD" herein) and a DL PRS expected RSTD uncertainty (referred to as an "expected RSTD uncertainty" herein) for a network device 201 (e.g., the network device 201 that sent the DL PRS). The expected RSTD uncertainty indicates the value of RSTD is expected to be measured between the network device 201 and an assistance data reference network device (e.g., another network device or a serving cell). If a physical cell identifier of the assistance data reference network device 201 is same as the physical cell identifier of the serving cell, the terminal device 203 can determine whether a PRS resource from the network device 201 can be measured outside of a time difference.

In some instances, the terminal device 203 determines a first absolute value. The first absolute value is the absolute value of the expected RSTD added to the expected RSTD uncertainty. The terminal device 203 also determines a second absolute value, which is the absolute value of the expected RSTD uncertainty subtracted from the value of the expected RSTD. If both absolute values are no more than a threshold, the terminal device 203 determines that the PRS resource can be measured outside of the time difference. The threshold may be set by parameters in the assistance data or may be configured for the terminal device 203. In one example, the threshold is the length of a contention period (CP) configured to an active bandwidth part (BWP) of the terminal device 203. In other instances, to determine if the PRS resource can be measured outside of the time difference, the terminal device 203 determines the absolute value of the value of the expected RSTD. If this absolute value is not more than the threshold, the terminal device 203 determines that the PRS resources from the network device 201 can be measured outside of the time difference.

In some embodiments, the terminal device 203 is provided with assistance data that includes an expected RSTD and an expected RSTD uncertainty for a network device 201. If a physical cell identifier of an assistance data reference network device 201 is not the same as the physical cell identifier of a serving cell, the terminal device 203 can determine whether a PRS resource from the network device 201 can be measured outside of a time difference. For instance, the terminal device 203 determines the absolute value of the expected RSTD configured to the network device 201 with the same physical cell identifier as the serving cell subtracted from the expected RSTD. If this absolute value is not more than the threshold, the terminal device 203 determines that the PRS resource of the network device 201 can be measured outside of the time difference.

Figure 3:
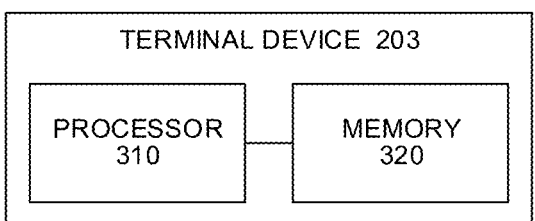
FIG. 3 is a schematic block diagram of a terminal device in accordance with one or more implementations of the present disclosure.

FIG. 3 is a schematic block diagram of a terminal device 203 (e.g., which can implement the methods discussed herein) in accordance with one or more implementations of the present disclosure. As shown, the terminal device 203 includes a processing unit 310 (e.g., a DSP, a CPU, a GPU, etc.) and a memory 320. The processing unit 310 can be configured to implement instructions that correspond to the method 400 of FIG. 4 and/or other aspects of the implementations described above. It should be understood that the processor 310 in the implementations of this technology may be an integrated circuit chip and has a signal processing capability. During implementation, the steps in the foregoing method may be implemented by using an integrated logic circuit of hardware in the processor 310 or an instruction in the form of software. The processor 310 may be a general-purpose processor, a digital signal processor (DSP), an application specific integrated circuit (ASIC), a field programmable gate array (FPGA) or another programmable logic device, a discrete gate or transistor logic device, and a discrete hardware component. The methods, steps, and logic block diagrams disclosed in the implementations of this technology may be implemented or performed. The general-purpose processor 310 may be a microprocessor, or the processor 310 may be alternatively any conventional processor or the like. The steps in the methods disclosed with reference to the implementations of this technology may be directly performed or completed by a decoding processor implemented as hardware or performed or completed by using a combination of hardware and software modules in a decoding processor. The software module may be located at a random-access memory, a flash memory, a read-only memory, a programmable read-only memory or an electrically erasable programmable memory, a register, or another mature storage medium in this field. The storage medium is located at a memory 320, and the processor 310 reads information in the memory 320 and completes the steps in the foregoing methods in combination with the hardware thereof.

It may be understood that the memory 320 in the implementations of this technology may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random-access memory (RAM) and is used as an external cache. For exemplary rather than limitative description, many forms of RAMs can be used, and are, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct Rambus random-access memory (DR RAM). It should be noted that the memories in the systems and methods described herein are intended to include, but are not limited to, these memories and memories of any other suitable type. In some embodiments, the memory may be a non-transitory computer-readable storage medium that stores instructions capable of execution by a processor.

Figure 4:
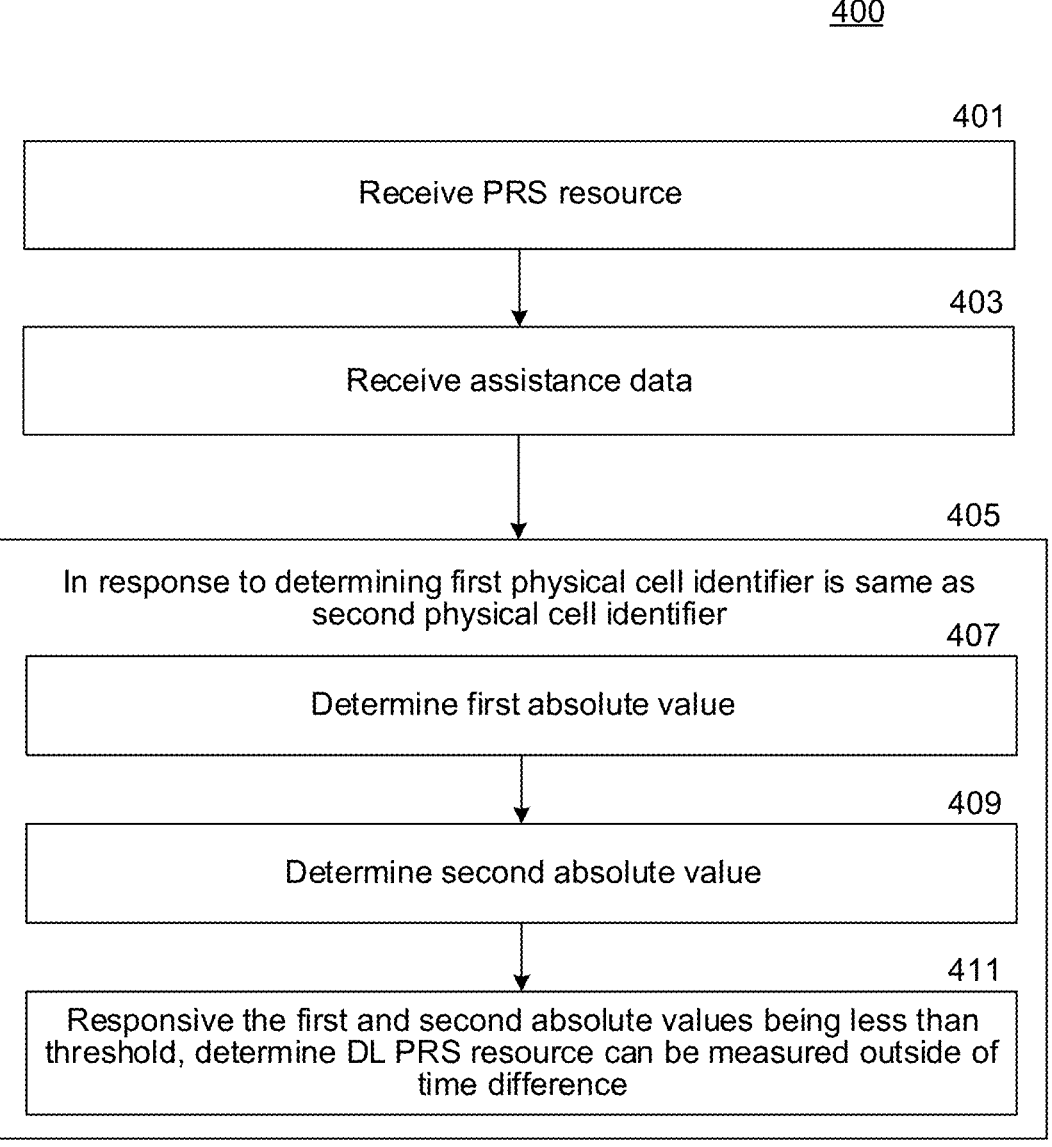
FIG. 4 is a flowchart of a method in accordance with one or more implementations of the present disclosure.

FIG. 4 is a flowchart of a method 400 in accordance with one or more implementations of the present disclosure. The method 400 can be implemented by a system (such as the wireless communications system 200). The method 400 may also be implemented solely by the terminal device 203. The method 400 is for determining whether to process a DL PRS outside a time difference. The method may be provided in a 3GPP (3rd Generation Partnership Project) NR specification. The DL PRS is the main reference signal that supports the positioning method employed by the system.

The method 400 includes, at block 401, receiving a PRS. The PRS may be received from a network device 201 or from the location server 207. The network device 201 may be a base station, TRP 101, or serving cell Next Generation NodeB (gNB).

At block 403, the method 400 continues by receiving assistance data. The assistance data includes an expected RSTD and an expected RSTD uncertainty for a network device 201 (e.g., the network device 201 that sent the DL PRS). The expected RSTD uncertainty indicates the value of RSTD is expected to be measured between the network device 201 (e.g., a TRP) and an assistance data reference network device (e.g., another TRP).

The method 400 continues by comparing a first physical cell identifier of the assistance data reference network device 201 and a second physical cell identifier of the network device 201. The physical cell identifiers each indicate a physical layer identity of the cells (e.g., the assistance data reference network device 201 and the network device 201). At block 405, in response to determining that the first and second physical cell identifiers match, the method performs the steps shown in blocks 407, 409, and 411.

At block 407, the method 400 continues by determining a first absolute value. In particular, the method takes the absolute value of the expected RSTD added to a DL PRS expected RSTD. At block 409, the method continues by determining a second absolute value by taking the absolute value of the DL PRS expected RSTD subtracted from the value of the expected RSTD. At block 411, in response to the first absolute value and second absolute value being less than a threshold, the method continues by determining that the DL PRS resource can be measured outside of the time difference.

In some embodiments, additional or alternative steps to those shown in FIG. 4 may be employed as part of the method 400. For example, in some embodiments, the method 400 includes processing the DL PRS resource outside of the time difference. In some embodiments, the expected RSTD uncertainty indicates a value of the expected RSTD that the terminal device is expected to measure between a TRP and the reference TRP.

In some embodiments, the assistance data includes the expected RSTD and the expected RSTD uncertainty for a TRP. In some embodiments, the assistance data includes the expected RSTD and the expected RSTD uncertainty for two or more TRPs. In some embodiments, the reference TRP can be selected from the two or more TRPs.

In some embodiments, the threshold can be indicative of a length of contention period (CP) configured to an active bandwidth part (BWP). In some embodiments, the threshold can be set by parameters in the assistance data.

ADDITIONAL CONSIDERATIONS

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the described technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/ or modified to provide alternative implementations or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

In the Detailed Description, numerous specific details are set forth to provide a thorough understanding of the presently described technology. In other implementations, the techniques introduced here can be practiced without these specific details. In other instances, well-known features, such as specific functions or routines, are not described in detail in order to avoid unnecessarily obscuring the present disclosure. References in this description to "an implementation/embodiment," "one implementation/embodiment," or the like mean that a particular feature, structure, material, or characteristic being described is included in at least one implementation of the described technology. Thus, the appearances of such phrases in this specification do not necessarily all refer to the same implementation/embodiment. On the other hand, such references are not necessarily mutually exclusive either. Furthermore, the particular features, structures, materials, or characteristics can be combined in any suitable manner in one or more implementations/embodiments. It is to be understood that the various implementations shown in the figures are merely illustrative representations and are not necessarily drawn to scale.

Several details describing structures or processes that are well-known and often associated with communications systems and subsystems, but that can unnecessarily obscure some significant aspects of the disclosed techniques, are not set forth herein for purposes of clarity. Moreover, although the following disclosure sets forth several implementations of different aspects of the present disclosure, several other implementations can have different configurations or different components than those described in this section. Accordingly, the disclosed techniques can have other implementations with additional elements or without several of the elements described below.

Many implementations or aspects of the technology described herein can take the form of computer- or processor-executable instructions, including routines executed by a programmable computer or processor. Those skilled in the relevant art will appreciate that the described techniques can be practiced on computer or processor systems other than those shown and described below. The techniques described herein can be implemented in a special-purpose computer or data processor that is specifically programmed, configured, or constructed to execute one or more of the computer-executable instructions described below. Accordingly, the terms "computer" and "processor" as generally used herein refer to any data processor. Information handled by these computers and processors can be presented at any suitable display medium. Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The term "and/or" in this specification is only an association relationship for describing the associated objects, and indicates that three relationships may exist, for example, A and/or B may indicate the following three cases: A exists separately, both A and B exist, and B exists separately.

These and other changes can be made to the disclosed technology in light of the above Detailed Description. While the Detailed Description describes certain examples of the disclosed technology, as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

A person of ordinary skill in the art may be aware that, in combination with the examples described in the implementations disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

I claim:

1. A method comprising:

receiving, from a network device by a terminal device, a downlink (DL) positioning reference signal (PRS) resource;

receiving assistance data, wherein the assistance data includes expected reference signal time difference (RSTD) and expected RSTD uncertainty; and determining whether a first physical cell identifier of a reference Transmission/Reception Point (TRP) is the same as a second physical cell identifier of the network device, wherein in response to determining that the first physical cell identifier of the reference TRP is the same as a second physical cell identifier of the network device, the method further comprises:

determining a first absolute value of the value of the expected RSTD added to a DL PRS expected RSTD;

determining a second absolute value of the DL PRS expected RSTD subtracted from the value of the expected RSTD; and in response to the first absolute value and second absolute value being less than a threshold, determining that the DL PRS resource can be measured outside of a time difference.

2. The method of claim 1, wherein the expected RSTD uncertainty indicates a value of the expected RSTD that the terminal device is expected to measure between a TRP and the reference TRP.

3. The method of claim 1, further comprising:

processing the DL PRS resource outside of the time difference.

4. The method of claim 1, wherein the assistance data includes the expected RSTD and the expected RSTD uncertainty for a TRP.

5. The method of claim 1, wherein the assistance data includes the expected RSTD and the expected RSTD uncertainty for two or more TRPs.

6. The method of claim 5, wherein the reference TRP is selected from the two or more TRPs.

7. The method of claim 1, wherein the threshold is indicative of a length of contention period (CP) configured to an active bandwidth part (BWP).

8. The method of claim 1, wherein the threshold is set by parameters in the assistance data.

9. A system for processing a positioning reference signal (PRS), the system comprising:

a processor; and a memory configured to store instructions, when executed by the processor, to cause a terminal device to perform operations of:

receiving, from a network device, the DL PRS resource;

receiving assistance data, wherein the assistance data includes expected reference signal time difference (RSTD) and expected RSTD uncertainty, the expected RSTD uncertainty indicating a value of the expected RSTD that the terminal device is expected to measure between a Transmission/Reception Point (TRP) and a reference TRP;

in response to determining that a first physical cell identifier of the reference TRP is the same as a second physical cell identifier of the network device:

determining a first absolute value of the value of the expected RSTD added to a DL PRS expected RSTD;

determining a second absolute value of the DL PRS expected RSTD subtracted from the value of the expected RSTD; and in response to the first absolute value and second absolute value being less than a threshold, determining that the DL PRS resource can be measured outside of the time difference.

10. The system of claim 9, wherein the expected RSTD uncertainty indicates a value of the expected RSTD that the terminal device is expected to measure between a TRP and the reference TRP.

11. The system of claim 9, further comprising:

processing the DL PRS resource outside of the time difference.

12. The system of claim 9, wherein the assistance data includes the expected RSTD and the expected RSTD uncertainty for a TRP.

13. The system of claim 9, wherein the assistance data includes the expected RSTD and the expected RSTD uncertainty for two or more TRPs.

14. The system of claim 13, wherein the reference TRP is selected from the two or more TRPs.

15. The system of claim 9, wherein the threshold is indicative of a length of contention period (CP) configured to an active bandwidth part (BWP).

16. The system of claim 9, wherein the threshold is set by parameters in the assistance data.

17. A non-transitory computer-readable storage medium, configured to store instructions, which cause a terminal device to perform operations of:

receiving, from a network device, the DL PRS resource;

receiving assistance data, wherein the assistance data includes expected reference signal time difference (RSTD) and expected RSTD uncertainty, the expected RSTD uncertainty indicating a value of the expected RSTD that the terminal device is expected to measure between a Transmission/Reception Point (TRP) and a reference TRP;

in response to determining that a first physical cell identifier of the reference TRP is the same as a second physical cell identifier of the network device:

determining a first absolute value of the value of the expected RSTD added to a DL PRS expected RSTD;

determining a second absolute value of the DL PRS expected RSTD subtracted from the value of the expected RSTD; and in response to the first absolute value and second absolute value being less than a threshold, determining that the DL PRS resource can be measured outside of the time difference.

18. The non-transitory computer-readable storage medium of claim 17, wherein the expected RSTD uncertainty indicates a value of the expected RSTD that the terminal device is expected to measure between a TRP and the reference TRP.

19. The non-transitory computer-readable storage medium of claim 17, further comprising:

processing the DL PRS resource outside of the time difference.

20. The non-transitory computer-readable storage medium of claim 17, wherein the assistance data includes the expected RSTD and the expected RSTD uncertainty for a TRP.

* * * * *